(12) United States Patent
Iwanaga (10) Patent No.: US 8,405,900 B2
(45) Date of Patent: Mar. 26, 2013

(54) PROJECTION APPARATUS

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/166,970

(22) Filed: Jun. 23, 2011

(65) Prior Publication Data

US 2011/0317247 A1 Dec. 29, 2011

(30) Foreign Application Priority Data

Jun. 25, 2010 (JP) ................ 2010-145621

(51) Int. Cl.
*G02B 26/00* (2006.01)
*G02B 26/08* (2006.01)

(52) U.S. Cl. ........ 359/292; 359/298; 359/569; 359/573; 353/31; 353/84; 353/98; 385/18

(58) Field of Classification Search .......... 359/290–295, 359/298, 851, 224.1, 569, 573; 353/7, 8, 353/30, 31, 33, 53, 81, 84, 98, 99; 385/15–18, 385/147; 250/216, 505.1
See application file for complete search history.

(56) References Cited

U.S. PATENT DOCUMENTS

| | | | | |
|---|---|---|---|---|
| 6,935,752 B2 * | 8/2005 | Jeon | ................ | 353/99 |
| 6,943,950 B2 * | 9/2005 | Lee et al. | ................ | 359/571 |
| 7,066,607 B2 * | 6/2006 | Kwon | ................ | 353/98 |
| 7,287,865 B2 * | 10/2007 | Kwon | ................ | 353/99 |
| 7,289,191 B2 | 10/2007 | Sumii | | |
| 7,630,135 B2 * | 12/2009 | Lee et al. | ................ | 359/573 |

FOREIGN PATENT DOCUMENTS

| | | |
|---|---|---|
| JP | 2003-66366 A | 3/2003 |
| JP | 2005-151375 A | 6/2005 |

* cited by examiner

*Primary Examiner* — Loha Ben
(74) *Attorney, Agent, or Firm* — Holtz, Holtz, Goodman & Chick, P.C.

(57) ABSTRACT

There is provided a projection apparatus including a light source, a micromirror element which tilts a plurality of micromirrors arranged in an array $+A°$ or $-A°$ ($A>0$) separately from an array surface to form a light image with light components reflected by the plurality of micromirrors, an illumination optical system which uses light emitted from the light source and causes illumination light whose incidence angle is $(2A+\alpha)°$ ($\alpha>0$) to enter the micromirror element from a direction to which a less than 45° turn is made from a narrow side direction of the array surface of the micromirror element, and a projection optical system which a light image output from the micromirror element enters and which projects the light image onto a projection object.

4 Claims, 6 Drawing Sheets

ON OPERATION

FIG.5B
PRIOR ART

OFF OPERATION

PROJECTION APPARATUS

CROSS-REFERENCE TO RELATED APPLICATIONS

This application is based upon and claims the benefit of priority from prior Japanese Patent Application No. 2010-145621, filed Jun. 25, 2010, the entire contents of which are incorporated herein by reference.

BACKGROUND OF THE INVENTION

1. Field of the Invention

The invention relates to a projection apparatus which causes light from a light source to enter a reflective image display element, forms a light image by the reflected light, and projects the light image.

2. Description of the Related Art

Figure 3:
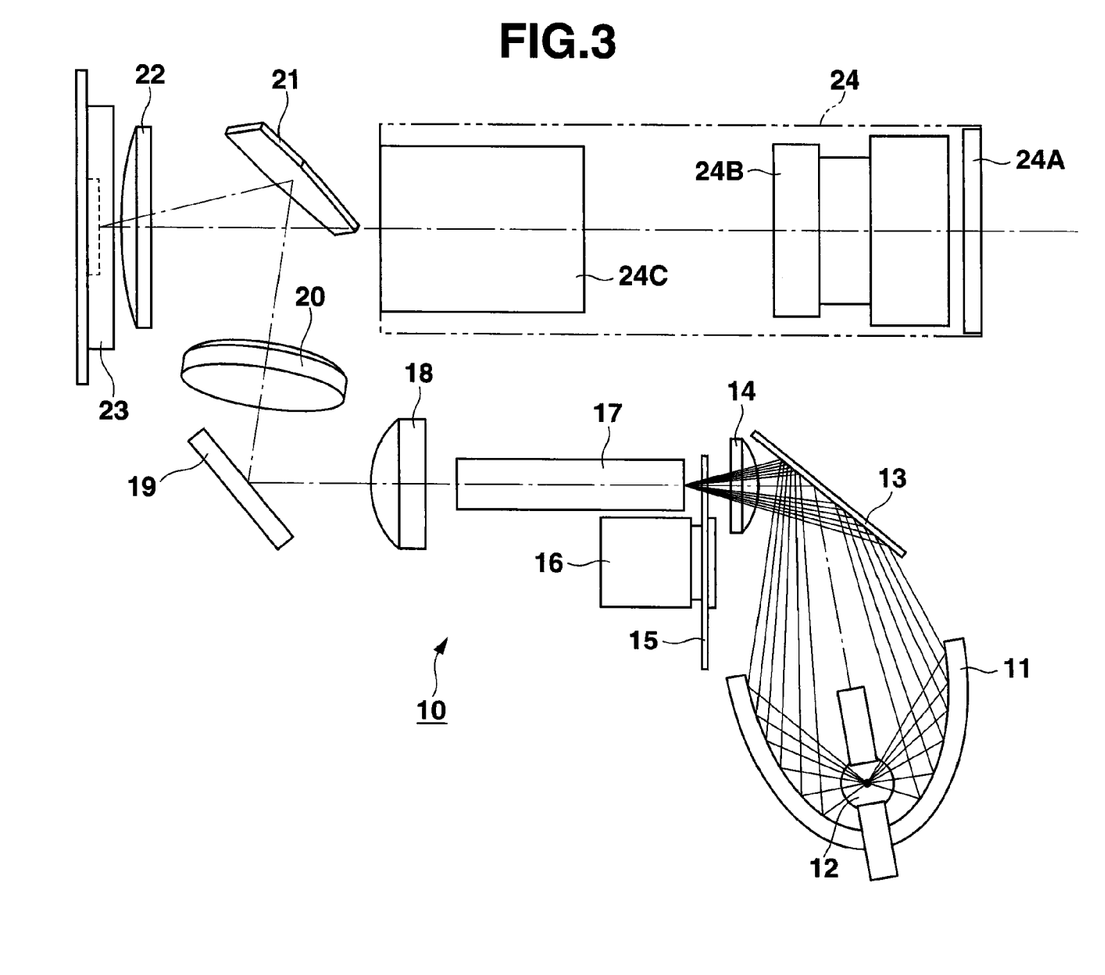
FIG. 3 is a plan view showing a configuration of the optical path of a general projector apparatus.

FIG. 3 is a plan view showing a configuration of a general projector apparatus 10 of the Digital Light Processing (DLP) (registered trademark) type using a micromirror element.

In FIG. 3, a high-pressure mercury lamp 12 acting as a light source is arranged inside a reflector 11 whose interior surface is mirror-like finished. The high-pressure mercury lamp 12 is driven by an alternating-current high-voltage power supply, thereby producing high-intensity white light.

Light produced by the high-pressure mercury lamp 12 is taken out directly or is reflected by the interior surface of the reflector 11 and taken out as a beam. After having been reflected by a first mirror 13, the beam passes through a lamp lens 14 and is directed onto a rotating color wheel 15.

The color wheel 15 is such that a disk-shaped surface part that is rotated by a color wheel motor 16 is composed of a red (R), a green (G), and a blue (B) sector-shaped color filter. Therefore, when the color wheel 15 is rotated by the color wheel motor 16, white light passing through the color wheel 15 is extracted as R, G, B primary color light components in a time-division manner. That is, the frequency ranges of R, G, B primary colors are extracted cyclically in a time-division manner. The resulting light components are then output.

When passing through a light tunnel 17, the R, G, B primary color light components output from the color wheel 15 repeat diffuse reflection inside the light tunnel. After the distribution of luminous flux density is averaged, the resulting light components are reflected by a second mirror 19 via an illumination system lens 18. The reflected light components are then reflected by a third mirror 21 via an illumination system lens 20. Thereafter, the resulting light components are directed onto a micromirror element 23 via a field lens 22.

The micromirror element 23 is an image display element also called a Digital Micromirror Device (DMD) (registered trademark). The micromirror element 23 performs on/off control of the inclination angle of each of the micromirrors arranged in an array, for example, as many pixels as there are in a XGA (1024 pixels×768 pixels), to make a display, thereby forming a light image by its reflected light.

The light image formed by the reflected light from the micromirror element 23 is sent to a projector lens unit 24 via a field lens 22. The projector lens unit 24 has a lens configuration of three groups, a first lens group 24A, a second lens group 24B, and a third lens group 24C, starting from the object side. The projector lens unit 24 enlarges a light image formed by the micromirror element 23 and projects the enlarged image onto a screen (not shown) or a projection object on which an image is to be projected.

Figure 4:
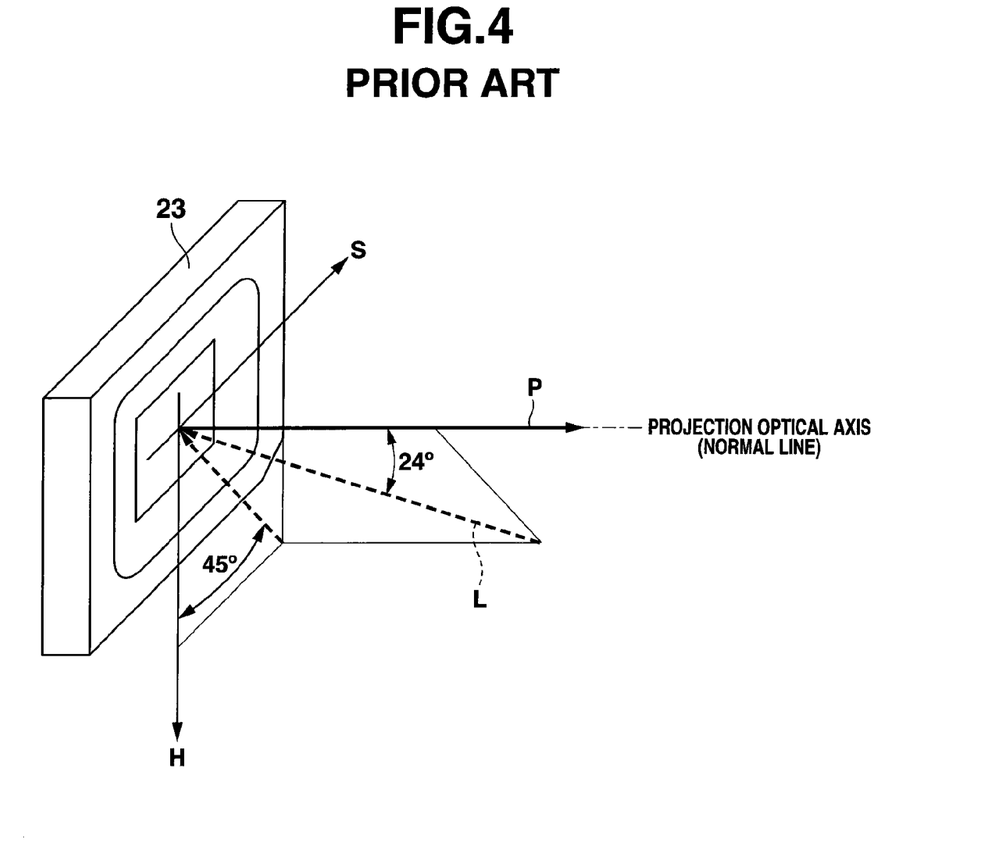
FIG. 4 is a perspective view to explain the relationship between the entry and emission of light at the micromirror element in FIG. 3.

FIG. 4 is a diagram to explain a concrete configuration of the entry and reflection of light at the micromirror element 23 in the configuration of FIG. 3. In FIG. 4, an illumination system optical axis L shown by a broken line enters the array surface of micromirrors at an incidence angle of 24° to a normal line in the direction of a projection optical axis N shown by a solid line from a direction to which a 45° turn is made from a direction H in which each micromirror faces in an on operation at the array surface of the micromirrors.

Figure 5A:
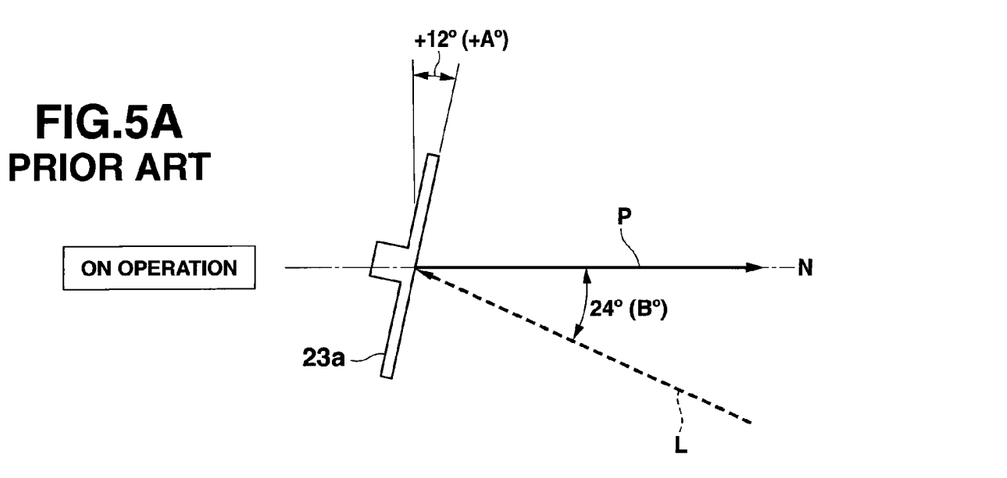
FIGS. 5A and 5B are diagrams to explain basic on/off operations of individual micromirrors constituting a micromirror element and paths of reflected light.
Figure 5B:
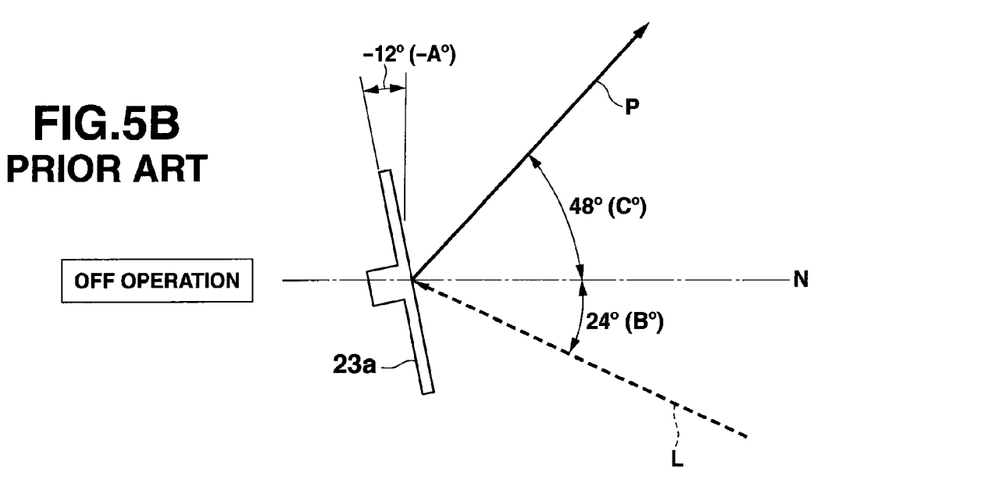

FIGS. 5A and 5B are diagrams to explain a basic on/off operation of an individual micromirror constituting the micromirror element 23. Suppose a micromirror 23a is tilt-controlled at an angle of ±12° by an on/off operation.

FIG. 5A shows a state where a micromirror 23a has been tilt-controlled by an on operation, that is, at an angle of +12° (+A°). As shown in FIG. 5A, reflected light from the micromirror 23a travels along the projection optical axis N, the normal line of the micromirror element 23, and goes out toward the projector lens unit 24.

FIG. 5B shows a state where the micromirror 23a has been tilt-controlled by an off operation, that is, at an angle of −12°−A°). As shown in FIG. 53, reflected light from the micromirror 23a travels along an off beam optical axis D 48° (C.°) from the projection optical axis N, the normal line of the micromirror element 23, and is directed onto a light-absorbing member (not shown).

In the basic configuration shown in FIGS. 5A and 5B, if an on/off angle of the micromirror 23a is ±A°, an incidence angle of the illumination system optical axis L to the projection optical axis N for the projector lens unit 24 in the direction of normal line of the micromirror element 23 is B, and an angle of an off beam optical axis D to the projection optical axis N in an off operation is C, the following equations are satisfied: C=2B=4A.

Neither the beam directed onto the micromirror 23a nor the beam reflected by the micromirror 23a is parallel. They take the form of a cone, with the micromirror 23a at the vertex.

Figure 6:
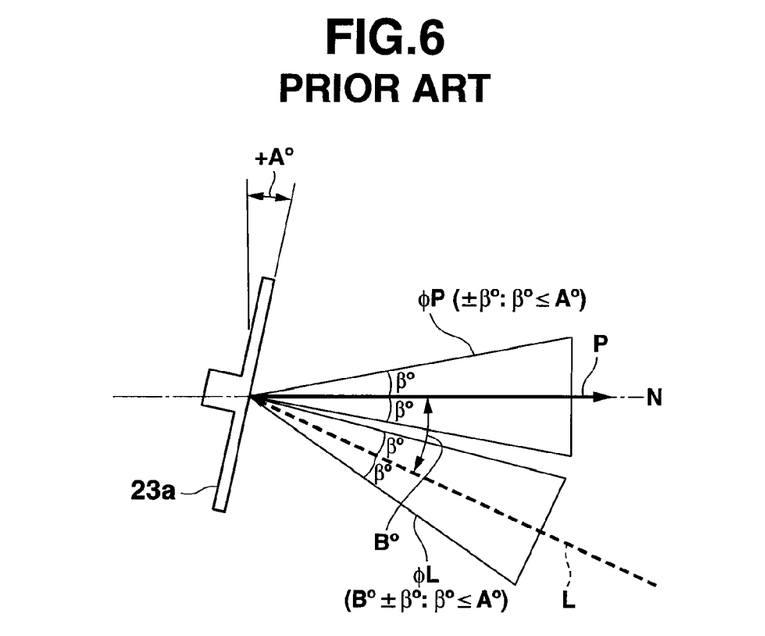
FIG. 6 shows an example of the relationship between an incident light beam and an outgoing light beam at a micromirror in an on operation.

FIG. 6 shows an example of beam of each of incident light and outgoing light at the micromirror 23a in an on operation recommended by a manufacturer of the micromirror element 23. If the vertex angle of each of illumination system beam φL, an incident beam, and projection system beam φP, an outgoing beam, is 2β°, β is made less than or equal to angle A through which the micromirror 23a can move, which enables the amount of light from a light source to be used for projection effectively without the overlapping of illumination system beam φL and projection system beam φP and the occurrence of a so-called eclipse in the projected beam.

To make a projected image brighter, setting larger the radius of an illumination system beam input to the micromirror element 23 can be considered. In that case, the vertex angle of 2β° of each of illumination system beam φL and projection system beam φP can be considered to exceed an angle B between illumination optical axis L and projection optical axis N.

Figure 7:
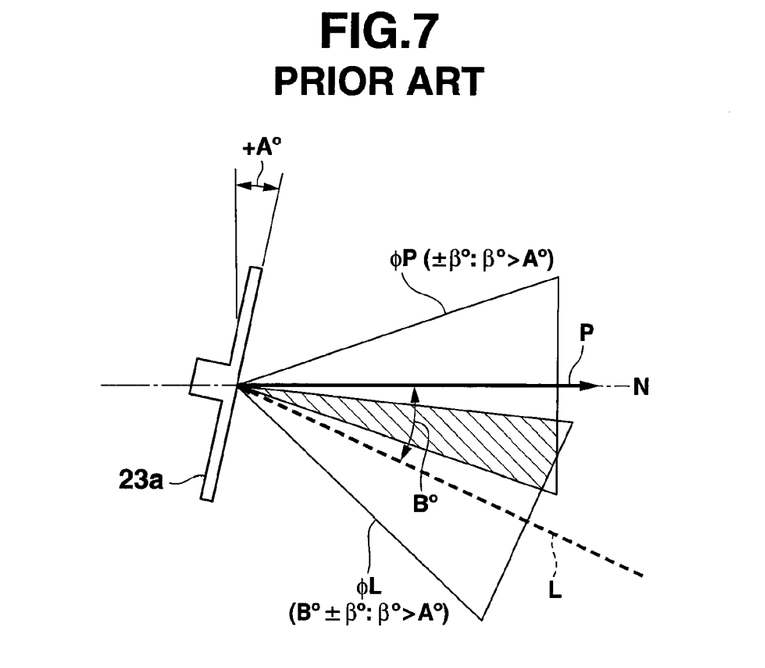
FIG. 7 shows an example of the relationship when the vertex angle of each beam in FIG. 6 is set larger.

FIG. 7 shows a case where the vertex angle of 2β of each of illumination system beam φL and projection system beam φP is set so as to exceed an angle B between illumination optical axis L and projection optical axis N. When the vertex angle of each beam is designed to be greater than or equal to the recommended value, a loss part where illumination system beam φL and projection system beam φP overlaps in space occurs as shown by a downward-sloping hatching part in FIG. 7.

The loss part where the beams overlap is where the beams are partially blocked out by the third mirror 21 on the actual device. A part of incident light to the micromirror element 23 is missing. This gives rise to a phenomenon of the amount of light at one end of the finally projected image decreasing more than the remaining part.

As described above, when the vertex angle of each of illumination system beam φL and projection system beam φP is set larger to make an image brighter, the most part becomes a brighter image, but the distribution of light amount becomes nonuniform, which makes the image quality lower.

Figure 8:
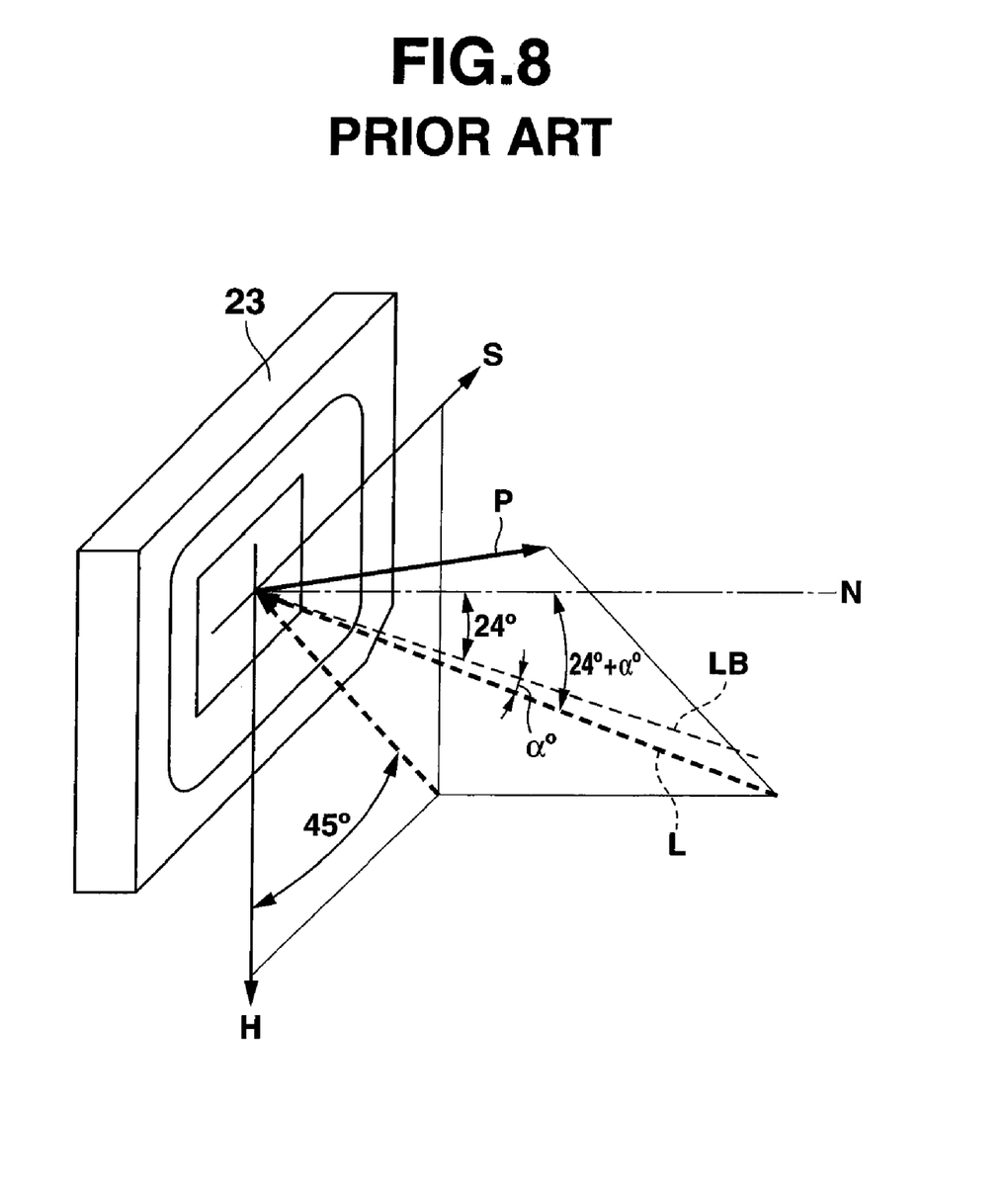
FIG. 8 is a perspective view to explain the relationship between the entry and emission of light when the incidence angle of the illumination system optical axis is mage greater than in FIG. 4.

FIG. 8 is a diagram to explain a case where the incidence angle of illumination optical axis L is set larger than regular 24° to avoid the overlapping of two beams whose vertex angle is made larger.

In FIG. 8, the illumination optical axis L shown by a broken line is caused to enter the micromirror array surface at an incidence angle of 24°+α (α>0) to the projection optical axis N shown by a dashed-dotted line from a direction to which a 45° turn is made from the narrow side direction H of the micromirror element 23, the direction in which each micromirror tilts in an on operation. In FIG. 8, line LB represents a regular illumination system optical axis with an incidence angle of 24°. As described above, setting the illumination optical axis L outside the original illumination system optical axis LB causes the projection beam optical axis P to depart from a tangential direction N, the original projection optical axis, which enables illumination system beam φL and projection system beam φP to be prevented from overlapping in space.

Similarly, a method of eliminating a beam component resulting in a loss by causing the optical axis of an illumination beam to enter at a large incidence angle to the original illumination system optical axis has been considered (e.g., Jpn. Pat. Appln. KOKAI Publication No. 2003-66366).

However, even if the optical axis of an illumination beam is caused to simply enter at an incidence angle larger than 24°, the original angle, from a direction to which a 45° turn is made from the narrow side direction of the micromirror element 23 as described in Jpn. Pat. Appln. KOKAI Publication No. 2003-66366, the distribution of a projection beam reflected by the micromirror element is left-right asymmetric. Therefore, the disadvantage is that the brightness of a projected image is also left-right asymmetric.

BRIEF SUMMARY OF THE INVENTION

Accordingly, it is an object to provide a projection apparatus which is capable of not only making brighter a projected image by using a beam greater than the originally assumed one on the basis of the configuration of a micromirror element but also equalizing the left-right balance of the brightness of the projected image to avoid the deterioration of image quality.

According to one aspect of the invention, there is provided a projection apparatus including a light source, a micromirror element which tilts a plurality of micromirrors arranged in an array +A° or −A° (A>0) separately from an array surface to form a light image with light components reflected by the plurality of micromirrors, an illumination optical system which uses light emitted from the light source and causes illumination light whose incidence angle is (2A+α)° (α>0) to enter the micromirror element from a direction to which a less than 45° turn is made from a narrow side direction of the array surface of the micromirror element, and a projection optical system which a light image output from the micromirror element enters and which projects the light image onto a projection object.

According to the invention, it is possible to provide a projection apparatus which is capable of not only making brighter a projected image by using a beam greater than the originally assumed one on the basis of the configuration of a micromirror element but also equalizing the left-right balance of the brightness of the projected image to avoid the deterioration of image quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter referring to the accompanying drawings, a preferred embodiment for putting the invention into practice will be explained. Although technically preferable limitations have been imposed on the embodiment described below to put the invention into practice, they do not limit the scope of the invention to the embodiment and illustrative examples.

Hereinafter, an embodiment where the invention is applied to a projector apparatus of the DLP (registered trademark) type using a micromirror element will be explained with reference to the accompanying drawings.

Individual elements constituting the projector apparatus are assumed to be basically the same as those of FIG. 3. The same parts as those of FIG. 3 are indicated by the same reference numbers and a diagrammatic representation and explanation of them will be omitted.

Figure 1:
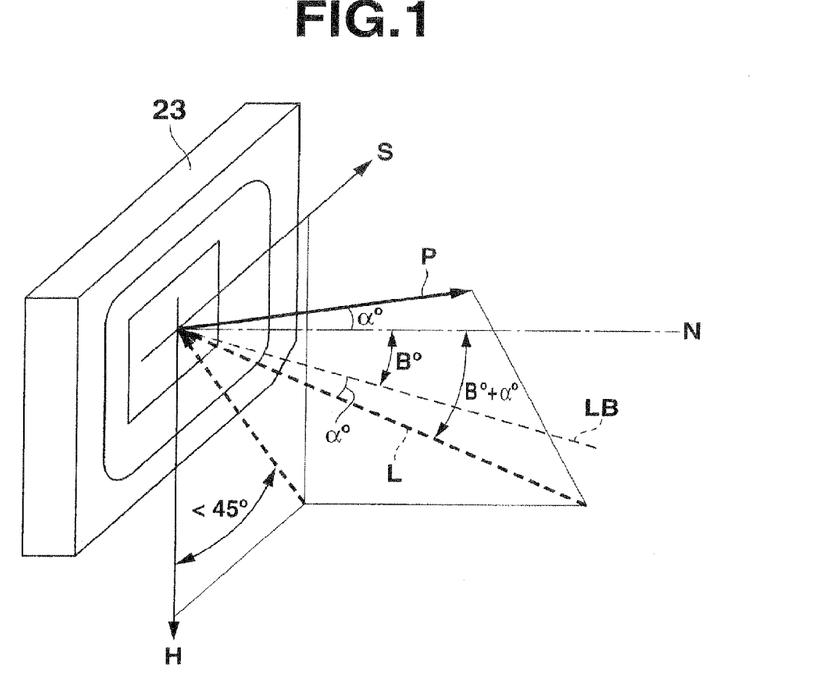
FIG. 1 shows an example of the relationship between an incident light beam and an outgoing light beam at a micromirror in an on operation according to an embodiment of the invention.

FIG. 1 is a diagram to explain a concrete configuration of the entry and emission of light at a micromirror element 23 according to the embodiment. In FIG. 1, line LB represents a design illumination system optical axis with an incidence angle of B°. An illumination system optical axis L is set so as to have a greater incidence angle than that of the design illumination system optical axis LB.

Specifically, the illumination system optical axis L shown by a broken line enters the array surface of micromirrors (23a) constituting the micromirror element 23 at an incidence angle of B°+α° (α>0) to a normal line shown by a dashed-dotted line in FIG. 1 from a direction to which a less than 45° turn is made from the narrow side direction H of the micromirror element 23.

Therefore, when a micromirror is in an on operation, reflected light from the micromirror is output at an output angle of α° on the opposite side of the illumination system optical axis L with the projection optical axis N sandwiched between them.

Figure 2:
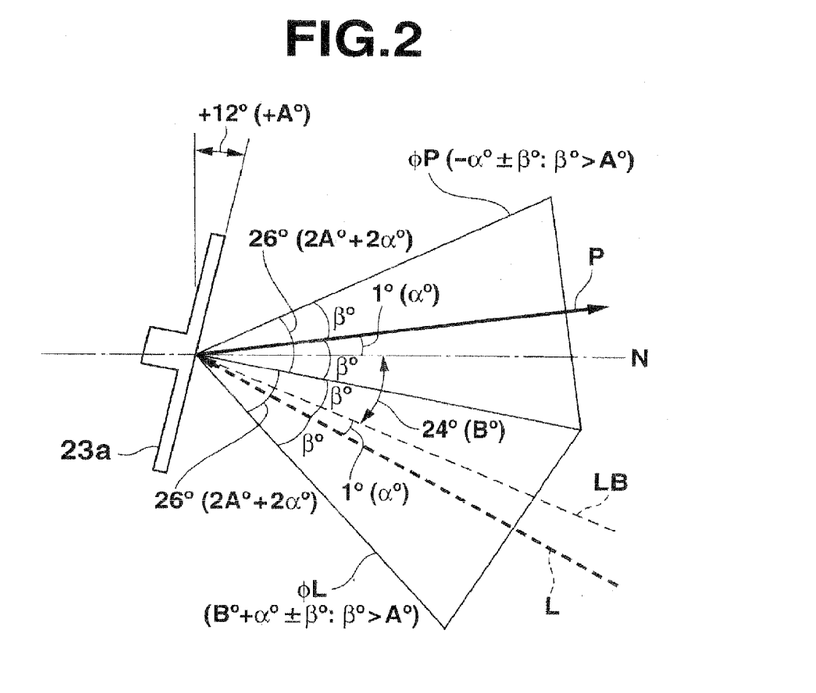
FIG. 2 shows an example of the relationship between an incident light beam and an outgoing light beam at a micromirror in an on operation according to the embodiment.

FIG. 2 shows an example of an incident light beam and an outgoing light beam when a micromirror 23a is in an on operation in a case where the illumination system optical axis L and projection system optical axis P have been set as described above.

A case where the incidence angle of the illumination system optical axis L is set to 25° (=24°+1°) will be explained on the assumption that the micromirror 23a tilts +12° (A=12, B=24) in an on operation. From the tilt angle of the micromirror element 23, the incidence angle of the design illumination system optical axis LB of the micromirror element 23 is 24°, causing illumination light to enter the micromirror element from the outside by 1° (α=1).

When the vertex angle of each of the illumination system beam φL, the incident beam, and the projection system beam φP, the outgoing beam, is set to 2β°, β becomes greater than an angle of A through which the micromirror 23a can move by α. However, the illumination system beam φL and the projection system beam φP do not overlap with each other and no eclipse has occurred in the projected beam.

In addition, as shown in FIG. 1, the direction in which the illumination system optical axis L enters is set to a direction to which a less than 45° turn is made from the narrow side direction of the micromirror element 23.

This sets the direction of the projection beam optical axis P of the projection system beam φP when the micromirror is in an on operation closer to the center with respect to the long side direction S of the micromirror element 23 by setting the incident direction using a much smaller turn angle while setting the illumination optical axis L to an incidence angle greater than the incidence angle to the design micromirror element 23.

Therefore, the distribution of projection beams reflected by the individual micromirrors of the micromirror element 23 as a result of an increase in the incidence angle does not become left-right asymmetric. In addition, the brightness of the projected image can keep left-right uniform.

Therefore, the optical load on the projector lens unit 24 becomes large. However, if the projection system beam φP reflected by the micromirror element 23 is all allowed to enter the projector lens unit and projected onto a projection object, a bright image can be projected, while avoiding degradation due to a left-right nonuniformity of brightness or the like.

The light beam intake angle of the projection optical system at this time is assumed to be the sum of the angle of the projection beam optical axis P to the projection optical axis N and half β of the vertex angle of the projection system beam φP, that is, (2A+2α°).

As described above, with this embodiment, it is possible not only to make a projected image brighter using a larger beam than a beam originally expected on the basis of the configuration of the micromirror element but also to avoid the deterioration of image quality by equalizing the left-right balance of brightness of the projected image.

The direction in which the illumination system optical axis L enters the micromirror element is set to (45−α°), less than 45°, from the opposing direction when the micromirror tilts +A°, which makes it possible to offset an increase in the incidence angle accurately and equalize a left-right distribution of the projected beam.

While in the embodiment, the invention has been applied to a projector apparatus of the DLP (registered trademark) type using a micromirror element, it is not limited in terms of an element serving as a light source, a projector system using an image display element, or a single plate type or a three-plate type. For instance, the invention may be applied to any type of projector, provided that the projector uses a mirror whose optical path length and reflection angle can be adjusted.

In addition, the invention is not limited to the above embodiment and may be practiced or embodied in still other ways without departing from the spirit or essential character thereof. The functions performed in the embodiment may be combined suitably if at all possible. The embodiment includes inventions of different stages and therefore various inventions can be extracted by combining suitably a plurality of structural requirements disclosed in the embodiment. For example, even if some are removed from all of the structural requirements shown in the embodiment, the resulting configuration can be extracted as an invention, provided that the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source;
   a micromirror element which tilts a plurality of micromirrors arranged in an array +A° or −A° (A>0) separately from an array surface to form a light image with light components reflected by the plurality of micromirrors;
   an illumination optical system which uses light emitted from the light source and causes illumination light whose incidence angle is (2A+α)° (α>0) to enter the micromirror element from a direction to which a less than 45° turn is made from a narrow side direction of the array surface of the micromirror element; and
   a projection optical system which the light image output from the micromirror element enters and which projects the light image onto a projection object.

2. The projection apparatus according to claim 1, wherein in a case where a coordinate system where a long side, a short side, and a normal line direction of the array surface of the micromirror element are set as an X-axis, a Y-axis, and a Z-axis, respectively, is set and an incident optical axis of the light source is set as an incident vector Vin, an optical axis that outputs the light source from a micromirror is set as an outgoing vector Vout, and a normal line vector when the micromirror element tilts +A° is set as Vn, the following are satisfied:

$$Vout * X\text{-axis vector}=0$$

$$Vout=2(Vn*Vin)*Vn-Vin$$

where * is an inner product of vectors.

3. The projection apparatus according to claim 2, wherein the projection optical system has a light beam intake angle of $(2A+2\alpha)°$.

4. The projection apparatus according to claim 1, wherein the projection optical system has a light beam intake angle of $(2A+2\alpha)°$.

* * * * *